(12) United States Patent
Lake (10) Patent No.: US 10,641,063 B2
(45) Date of Patent: May 5, 2020

(54) SAFETY VALVE WITH INTEGRAL ANNULAR CHAMBER HOUSING

(71) Applicant: WEATHERFORD TECHNOLOGY HOLDINGS, LLC, Houston, TX (US)

(72) Inventor: Gary Benjamin Lake, Cypress, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 136 days.

(21) Appl. No.: 15/602,907

(22) Filed: May 23, 2017

(65) Prior Publication Data

US 2018/0340397 A1 Nov. 29, 2018

(51) Int. Cl.
*E21B 34/14* (2006.01)
*E21B 34/10* (2006.01)
*E21B 34/06* (2006.01)
*E21B 47/06* (2012.01)
*B33Y 80/00* (2015.01)
(Continued)

(52) U.S. Cl.
CPC ............ *E21B 34/14* (2013.01); *B22F 3/1055* (2013.01); *B22F 5/106* (2013.01); *B23P 15/001* (2013.01); *B33Y 10/00* (2014.12); *B33Y 80/00* (2014.12); *E21B 34/06* (2013.01); *E21B 34/066* (2013.01); *E21B 34/10* (2013.01); *E21B 47/06* (2013.01);
(Continued)

(58) Field of Classification Search
CPC .......... E21B 34/14; E21B 34/06; E21B 34/10; E21B 34/066; E21B 47/06; B33Y 10/00; B33Y 80/00; B22F 5/106; B22F 3/1055; B23P 15/001; Y10T 29/49982; Y10T 29/49984; F16K 27/0227
See application file for complete search history.

(56) References Cited

U.S. PATENT DOCUMENTS 5,799,949 A 9/1998 Beall et al.
6,523,614 B2 2/2003 Dennistoun et al.
(Continued)

FOREIGN PATENT DOCUMENTS

JP 2017001260 A * 1/2017 ............ B29C 33/02
WO 2016/133497 A1 8/2016

OTHER PUBLICATIONS

Weatherford; "WCT Communication Tool Overview", company presentation, dated 2016, 8 pages.
(Continued)

*Primary Examiner* — Bayan Salone
(74) *Attorney, Agent, or Firm* — Smith IP Services, P.C.

(57) ABSTRACT

A method of manufacturing a safety valve chamber housing can include depositing a chamber housing material, and thereby gradually building up the chamber housing and forming a chamber in the chamber housing enclosed by the chamber housing material, the chamber being bounded by only a single solid structure of the chamber housing. A safety valve can include a piston, and a chamber housing having a piston bore and a chamber formed therein, the piston bore being in communication with the chamber, the chamber being enclosed by only a single chamber housing material. A well system can include a safety valve connected in a tubular string, the safety valve including a chamber housing with a chamber in communication with a control line, inner and outer walls of the chamber housing being made of a continuous chamber housing material.

5 Claims, 6 Drawing Sheets

(51) Int. Cl.
*B22F 5/10* (2006.01)
*B23P 15/00* (2006.01)
*F16K 27/02* (2006.01)
*B22F 3/10* (2006.01)
*B33Y 10/00* (2015.01)
*B22F 3/105* (2006.01)
*E21B 34/00* (2006.01)

(52) U.S. Cl.
CPC .... *F16K 27/0227* (2013.01); *E21B 2034/005* (2013.01)

(56) References Cited

U.S. PATENT DOCUMENTS

| | | | |
|---|---|---|---|
| 2005/0061519 A1* | 3/2005 | Wagner | E21B 34/101 166/386 |
| 2006/0070744 A1 | 4/2006 | Smith | |
| 2015/0273586 A1 | 10/2015 | Ross | |
| 2016/0341335 A1* | 11/2016 | Adams | F16K 47/08 |
| 2018/0133932 A1* | 5/2018 | Kawaki | B29C 33/02 |

OTHER PUBLICATIONS

International Search Report with Written Opinion dated Jul. 17, 2018 for PCT Patent Application No. PCT/US2018/027940, 14 pages.

Examination Report dated Nov. 24, 2019 for GCC Patent Application No. 2018-35331, 4 pages.

\* cited by examiner

SAFETY VALVE WITH INTEGRAL ANNULAR CHAMBER HOUSING

BACKGROUND

This disclosure relates generally to equipment utilized and operations performed in conjunction with subterranean wells and, in an example described below, more particularly provides a safety valve having an annular chamber housing that is integrally formed.

A safety valve is used to provide a fail-safe barrier against inadvertent escape of fluids from a well. A safety valve is typically operated to its open and closed configurations in response to signals transmitted from surface or another remote location.

It will, thus, be appreciated that improvements are continually needed in the arts of constructing and utilizing safety valves for use in subterranean wells. These improvements could be useful with a variety of different types of safety valves and in a variety of different well installations.

DETAILED DESCRIPTION

Figure 1:
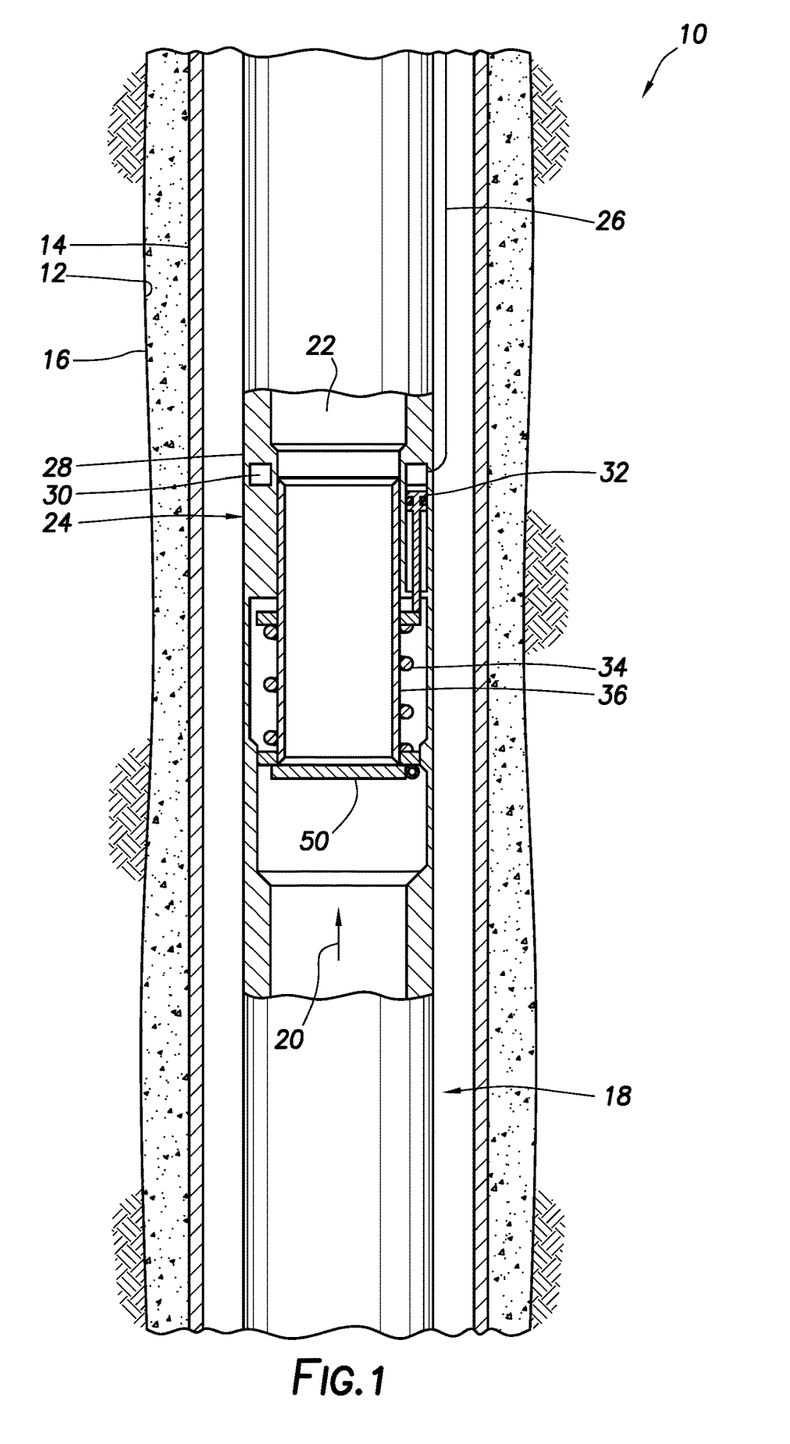
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a wellbore 12 has been drilled into the earth, and has been lined with casing 14 and cement 16. A tubular string 18 (such as, a production tubing string, a completion string, etc.) is installed in the casing 14.

Although the cased wellbore 12 is depicted in FIG. 1 as being generally vertical at a selected location of the tubular string 18, in other examples, sections of the wellbore may be inclined or generally horizontal, and the wellbore may not be cased or cemented. Thus, the scope of this disclosure is not limited to any of the details of the system 10 as depicted in the drawings or described herein.

As depicted in FIG. 1, a fluid 20 can be produced to surface via a flow passage 22 extending longitudinally through the tubular string 18. However, a safety valve 24 connected as part of the tubular string 18 prevents such flow of the fluid 20 when the safety valve is closed (as shown in FIG. 1). The term "safety valve" is used herein to refer to a valve that selectively permits and prevents flow through a tubular string, and is particularly designed with fail-safe capability, so that the valve closes in order to prevent inadvertent release of fluids from a well.

In the FIG. 1 example, the safety valve 24 is closed, unless a sufficient hydraulic pressure is applied to a control line 26 extending to a pressure source (such as, a pump or an accumulator, not shown) at a remote location (such as, the earth's surface, a subsea wellhead, a floating rig, another location in the well, etc.). The safety valve 24 opens when the sufficient pressure is applied to the control line 26.

The control line 26 is connected to a chamber housing 28 of the safety valve 24. The chamber housing 28 has a fluid chamber 30 formed therein, which is in fluid communication with the control line 26.

As depicted in FIG. 1, the fluid chamber 30 comprises an annulus extending circumferentially about the flow passage 22. The annulus is an annular void in the chamber housing 28. In other examples, the fluid chamber 30 may not have an annular shape.

A piston 32 is reciprocably and sealingly received in the chamber housing 28. Increased pressure applied to the control line 26 tends to bias the piston 32 downward (as viewed in FIG. 1) toward an open position. When sufficient pressure is not supplied to the control line 26, a spring 34 biases the piston 32 to displace upward (as viewed in FIG. 1) toward the closed position depicted in FIG. 1.

The piston 32 is connected to a generally tubular opening prong or flow tube 36. The flow tube 36 is reciprocably received in the chamber housing 28 and forms part of the flow passage 22. The flow tube 36 displaces with the piston 32 between the open and closed positions.

In the FIG. 1 example, the safety valve 24 includes a pivotably mounted flapper 50 that blocks upward flow through the flow passage 22 in the closed position, but in the open position permits flow through the flow passage in both longitudinal directions. In other examples, other types of valve mechanisms or closure devices may be used (for example, a ball valve, a plug valve, a poppet valve, a sliding sleeve valve, etc.).

Figure 2:
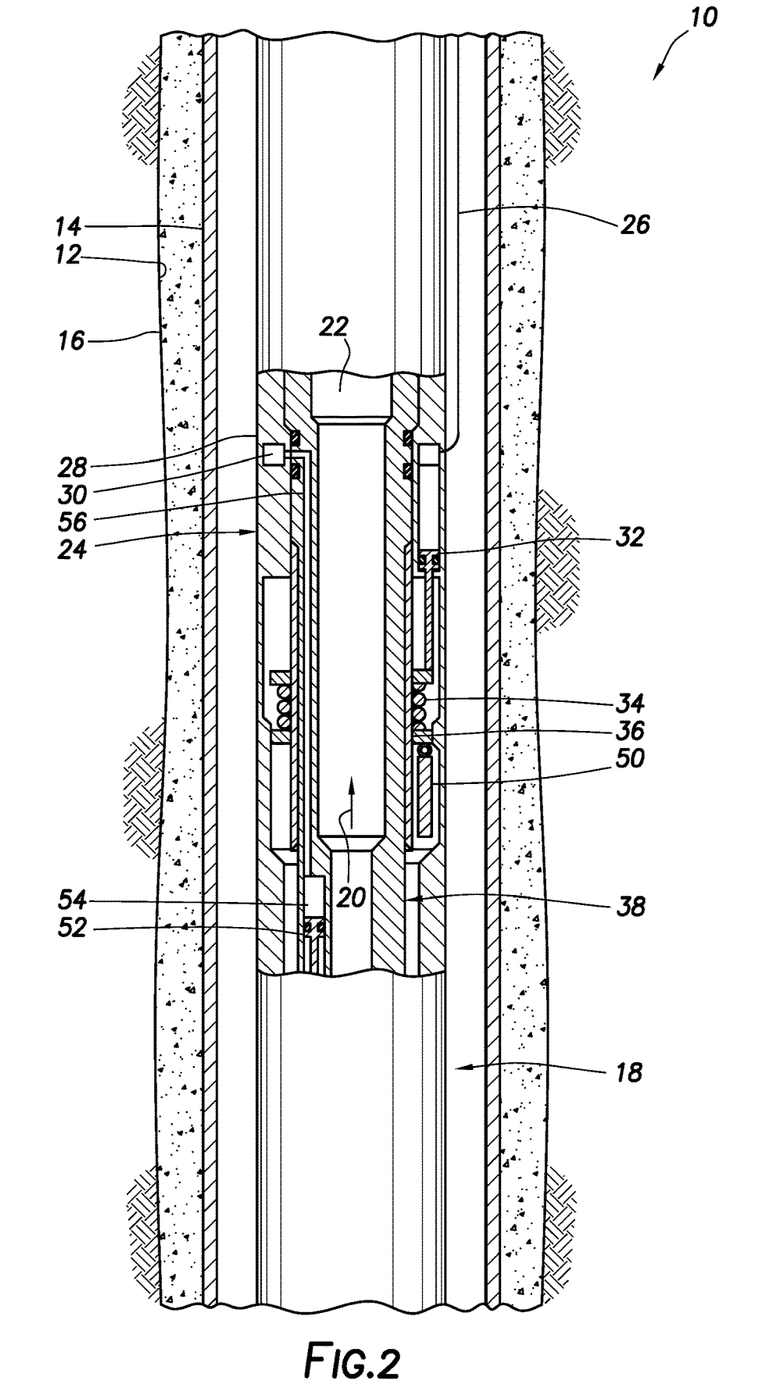
FIG. 2 is a representative partially cross-sectional view of the FIG. 1 system and method, in which a secondary safety valve has communicated with an annular chamber in a primary safety valve.

Referring additionally now to FIG. 2, the system 10 and method are representatively illustrated with the safety valve 24 in its open configuration, and an insert safety valve 38 installed in the safety valve 24. Note that the flapper 50 no longer blocks flow through the flow passage 22, and the insert safety valve 38 now controls (e.g., selectively permits and prevents) flow of the fluid 20 through the flow passage.

In a typical operation to install the insert safety valve 38, a lockout tool (not shown) may first be conveyed into the safety valve 24, in order to lock the safety valve 24 in an open configuration (in this example, with the flow tube 36 and the flapper 50 locked in their open positions). Then, a communication tool (not shown) may be used to form an opening between the flow passage 22 and the chamber 30. In some examples, the lockout tool and the communication tool may be combined into a single lockout and communication tool.

When the safety valve 24 has been locked in its open configuration and the chamber 30 has been communicated with the flow passage 22, the insert safety valve 38 can be conveyed and installed into the safety valve 24. Typically, the insert safety valve 38 will have seals straddling the opening that provides fluid communication with the chamber 30, so that the insert safety valve 38 is placed in fluid communication with the chamber 30.

The insert safety valve 38 in this example includes a piston 52 and a fluid chamber 54 for actuating the insert safety valve 38, in a manner similar to that described above for the safety valve 24. For example, the insert safety valve 38 could include components similar to the chamber housing 28, spring 34, flow tube 36 and flapper 50 of the safety valve 24, as well as the piston 52 and chamber 54, for actuating the insert safety valve 38 to its open and closed configurations.

The chamber 54 is placed in fluid communication with the chamber 30 of the safety valve 24 via a flow path 56. In this manner, the insert safety valve 38 can be actuated in response to pressure variations in the control line 26, in much the same way as described above for the safety valve 24.

Although the insert safety valve 38 in the FIG. 2 example is actuated in a manner similar to the safety valve 24, in other examples the insert safety valve 38 could operate in a manner different from the safety valve 24. For example, the insert safety valve 38 could include an electro-hydraulic actuator that activates an electrical device in response to a sensed pressure in the chamber 54. Thus, the scope of this disclosure is not limited to use of any particular type of actuator with the safety valve 24 or the insert safety valve 38.

The insert safety valve 38 may include or be combined with a communication tool (not shown in FIG. 2) for forming an opening in the inner wall of the chamber housing 28, so that the chamber 30 is placed in fluid communication with the flow path 56. The insert safety valve 38 may also include provisions for causing the safety valve 24 to be locked in its open configuration. Use of a communication tool to provide for fluid communication with the chamber 30 is described more fully below in relation to FIG. 6.

Figure 3:
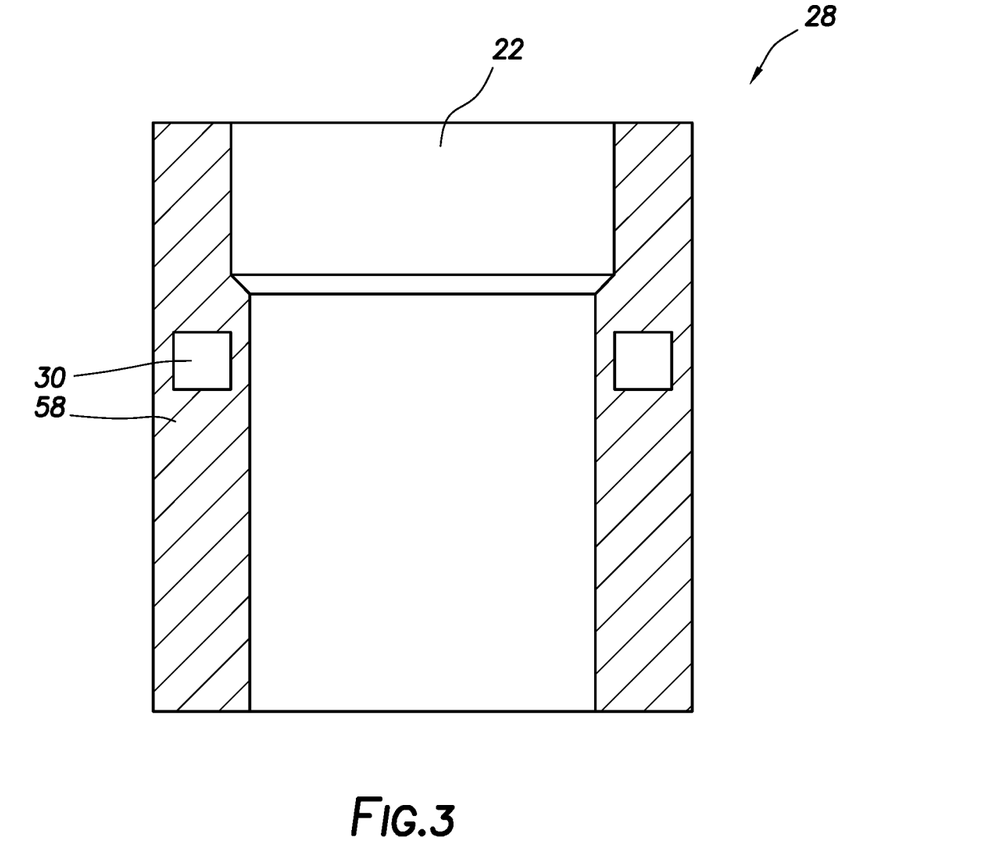
FIG. 3 is a representative cross-sectional view of an example of a chamber housing of the primary safety valve.

Referring additionally now to FIG. 3, a representative cross-sectional view of the chamber housing 28 is illustrated, apart from the remainder of the safety valve 24. However, the chamber housing 28 could be used in other safety valves, in keeping with the principles of this disclosure.

As depicted in FIG. 3, the chamber housing 28 has the chamber 30 and the flow passage 22 therein, but does not yet have a bore for the piston 32 formed therein, or any provisions for connecting the chamber housing 28 to other components.

In one aspect of this disclosure, the chamber 30 can be formed in the chamber housing 28 in a manner that eliminates potential leak paths that result from connections between components. In the FIG. 3 example, only a single solid structure of the chamber housing 28 encloses the chamber 30. Thus, multiple components are not surrounding the chamber 30, with at least one connection between the components providing a potential leak path.

In another aspect of this disclosure, only a single chamber housing material 58 may surround the chamber 30 in some examples. The material 58 can be continuous about the chamber 30, so that there are no seams or breaks in the material to form potential leak paths.

In yet another aspect of this disclosure, the chambers 30 can be formed in the chamber housing 28, without removing the chamber housing material 58 from the wall of the chamber housing 28. Instead, the chamber housing material 58 can be deposited about the chamber 30 using various methods.

Figure 4:
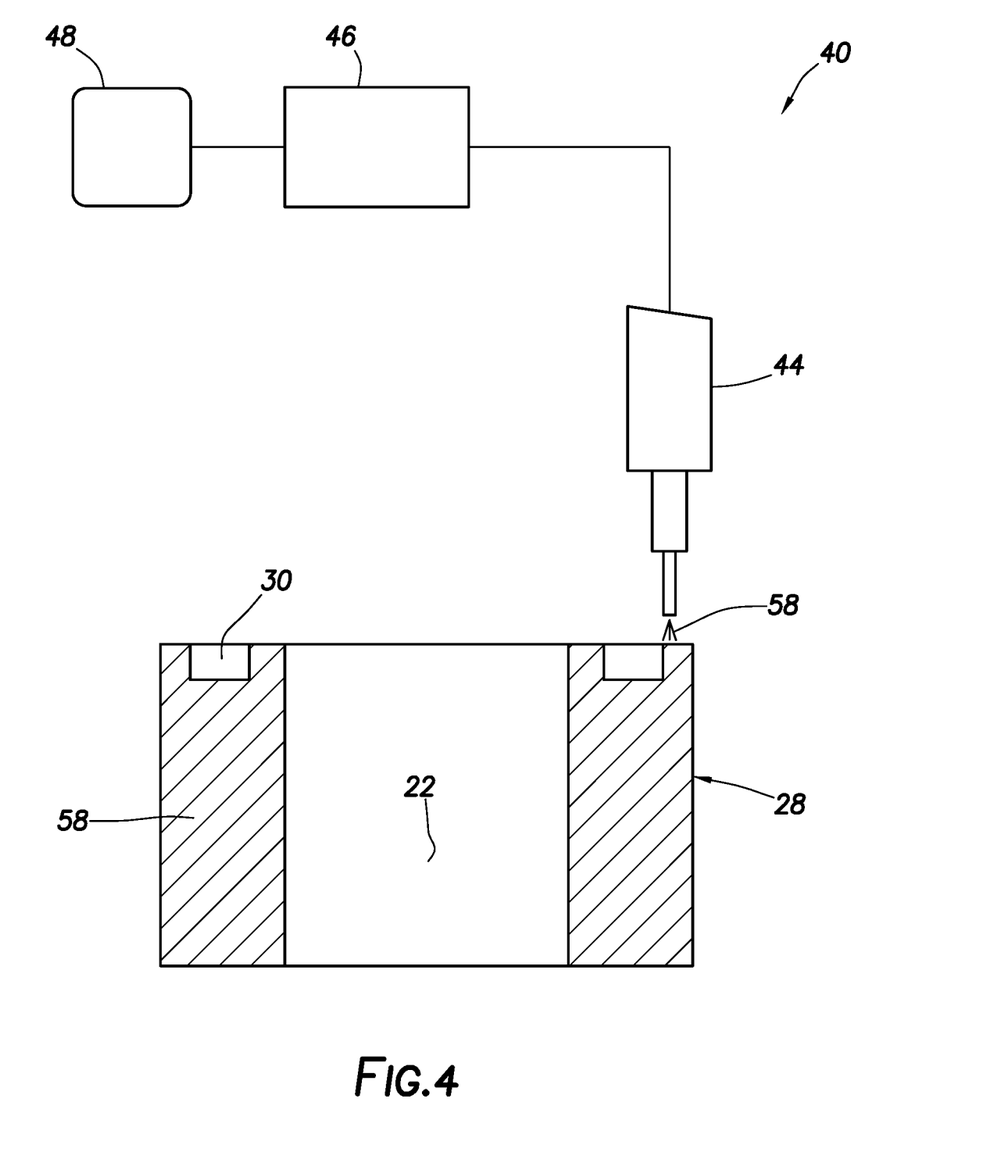
FIG. 4 is a representative schematic view of an example of a technique for constructing the chamber housing.

Referring additionally now to FIG. 4, an example method 40 of manufacturing a chamber housing 28 is representatively illustrated. The chamber housing 28 example depicted in FIG. 4 may be used in the safety valve 24 described herein, or the chamber housing 28 may be used in other safety valves.

In the FIG. 4 example, the chamber housing material 58 is progressively deposited by an instrument 44 to thereby construct the chamber housing 28. The material 58 may be deposited by, for example, spraying, ejecting, dispensing, pouring or otherwise placing the material 58 so that it becomes an integral part of the chamber housing 28. In this example, each successive pass of deposited material 58 becomes bonded to or fused with at least one selected previously deposited pass of the material 58, so that the chamber housing 28 is gradually built up as an integral combination of all of the passes of the material 58 deposited by the instrument 44.

The instrument 44 is controlled (e.g., spatial coordinates, motion characteristics, material 58 flow rate and type, etc.) by a control system 46. The control system 46 is provided with certain inputs 48 (such as, operator inputs, three-dimensional models, pre-programmed instructions, etc.).

The control system 46 can cause the instrument 44 to deposit the chamber housing material 58 so that the resulting chamber housing 28 is constructed with certain unique features that enhance the functionality of the chamber housing 28. In this example, one feature is the chamber 30 that is formed with an annular shape in the chamber housing 28 as the material 58 is deposited by the instrument.

In some examples, the chamber housing material 58 deposited by the instrument 44 can be a metal or metallic material. The chamber housing material 58 may comprise one or more metals or metal alloys. As used herein, the terms "metal," "metallic" and similar terms refer to materials comprising, in whole or in part, at least one metal or metal alloy.

In harsh environments, in particular, the chamber housing material 58 may advantageously comprise a metal or metallic material. Such materials generally possess superior properties as compared to other materials (such as elastomers or other polymers). However, it is not necessary for all or any portion of the chamber housing 28 to comprise a metal or metallic material in keeping with the scope of this disclosure.

Figure 5:
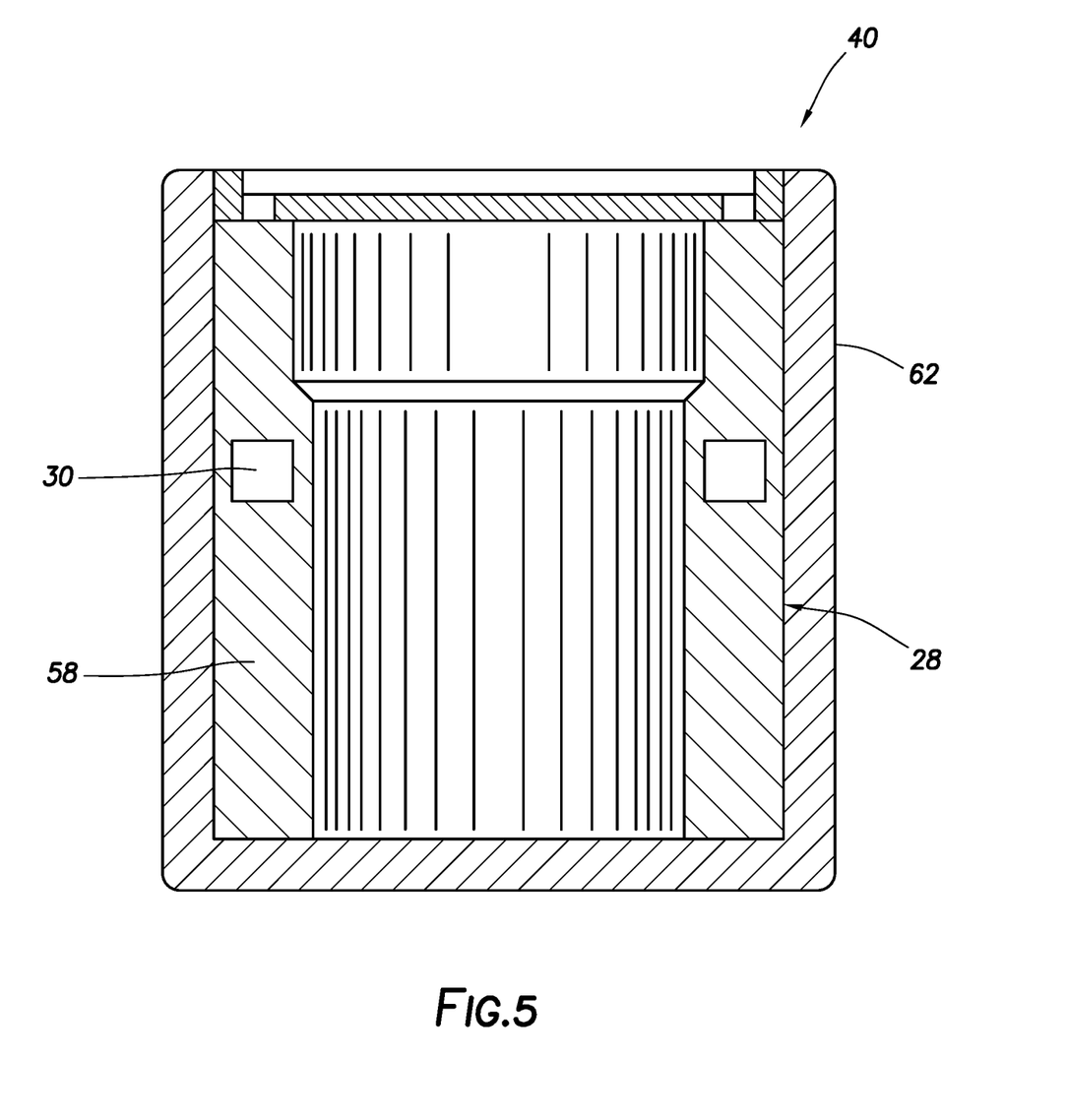
FIG. 5 is a representative partially cross-sectional view of another example of the technique for constructing the chamber housing.

Referring additionally now to FIG. 5, another example of the method 40 is representatively illustrated. In this example, the chamber housing material 58 is deposited about the chamber 30 by pouring the material into a mold 62. The chamber 30 can be formed as an annular void in the chamber housing 28 as the material 58 is being poured.

If the chamber housing material 58 comprises a metal, the material may be melted, and then poured into the mold 62 in its molten state, so that the chamber housing is cast in the mold. The chamber housing 28 can be permitted to solidify in the mold 62, and then proceed to subsequent machining operations or other manufacturing operations (such as, heat treatment, surface treatment, etc.). However, it is not necessary for the chamber housing material 58 to comprise a metal (e.g., polymers, composites or other materials may be used).

Figure 6:
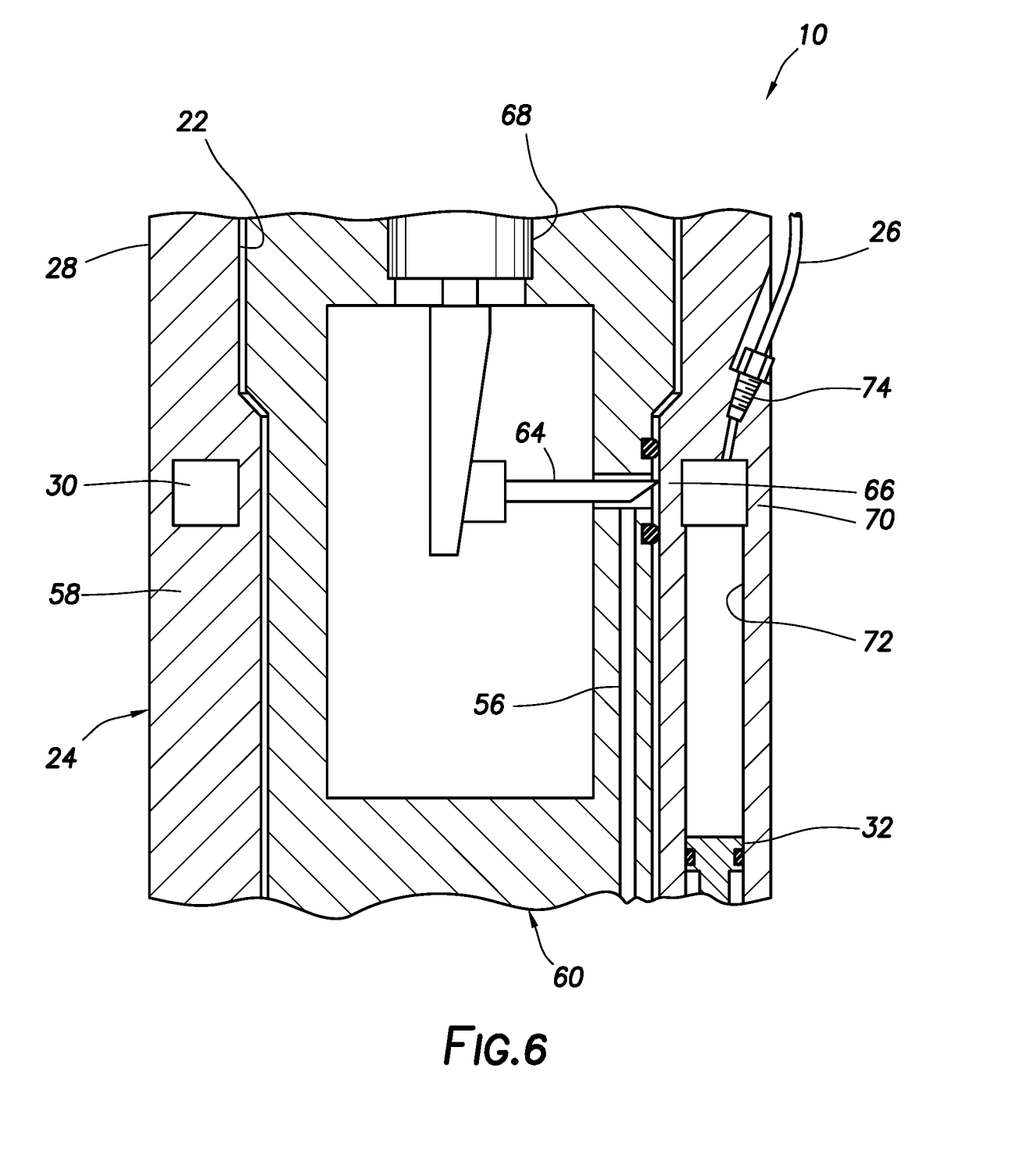
FIG. 6 is a representative cross-sectional view of an example of a technique for communicating with the chamber in the chamber housing.

Referring additionally now to FIG. 6, the chamber housing 28 is representatively illustrated as part of the safety valve 24 in the system 10 of FIGS. 1 & 2. A communication tool 60 is used to provide fluid communication between the chamber 30 and the flow path 56. As mentioned above, the communication tool 60 may be combined with the insert safety valve 38, with a lockout tool, or it may be a separate tool.

The communication tool 60 is depicted in FIG. 6 as having the flow path 56 formed therein, in which case the insert safety valve 38 could be connected to the communication tool to receive fluid pressure from the flow path. In other examples, the flow path 56 may not be formed in the communication tool 60. Thus, the scope of this disclosure is not limited to any particular details of the communication tool 60 as depicted in the drawings or described herein.

The communication tool 60 depicted in FIG. 6 includes a member 64 that pierces, penetrates or otherwise opens an inner wall 66 of the chamber housing 28 between the chamber 30 and the flow passage 22. The member 64 may be displaced by an actuator 68 of the communication tool 60. When the inner wall 66 has been opened, the chamber 30 can be in fluid communication with the flow path 56.

In the FIG. 6 example, it is not necessary for the communication tool 60 to be rotationally oriented in the flow passage 22 relative to the chamber housing 28. This is due to the fact that the chamber 30 is annular shaped and extends about the flow passage 22, so that the communication tool 60 can open the inner wall 66 at any location 360 degrees about the flow passage, in order to provide for communication between the chamber 30 and the flow path 56. However, the scope of this disclosure is not limited to any particular shape of the chamber 30, or to the capability of opening the inner wall 66 at any location 360 degrees about the flow passage 22.

Note that an outer wall 70 of the chamber housing 28 (between the chamber 30 and an exterior of the chamber housing 28) can be made of the same chamber housing material 58 as the inner wall 66. The inner and outer walls 66, 70 are parts of a same single solid structure of the chamber housing 28 surrounding the chamber 30.

Note, also, that the chamber housing 28 has a piston bore 72 and a control line port 74 formed therein. The piston 32 is reciprocably and sealingly received in the piston bore 72. The control line port 74 provides for connection of the control line 26 to the chamber 30 in the chamber housing 28.

The piston bore 72 and control line port 74 can be formed in the chamber housing 28 after the chamber housing has been formed with the chamber 30 therein. In this manner, the piston bore 72 and the control line port 74 can intersect (or otherwise be placed in communication with) the chamber 30 previously formed in the chamber housing 28.

It may now be fully appreciated that the above disclosure provides significant advancements to the arts of constructing and utilizing safety valves in subterranean wells. In one example described above, an annular fluid chamber 30 can be provided in a safety valve 24 in a manner that reduces potential leak paths, and also provides for convenient and reliable communication with the chamber.

The above disclosure provides to the arts a method 40 of manufacturing a safety valve chamber housing 28. In one example, the method 40 can include depositing a chamber housing material 58, and thereby gradually building up the chamber housing 28 and forming a chamber 30 in the chamber housing 28 enclosed by the chamber housing material 58, the chamber 30 being bounded by only a single solid structure of the chamber housing 28.

The forming step can include forming the chamber 30 as an annulus that encircles a central longitudinal flow passage 22 formed through the chamber housing 28.

The depositing step can include progressively discharging the chamber housing material 58 from an instrument 44, placing the chamber housing material 58 in a mold 62, or casting the chamber housing material 58 about the chamber 30.

The method may include, after the depositing step, forming a piston bore 72 in the chamber housing 28, and communicating the piston bore 72 with the chamber 30.

The method may include, after the depositing step, forming a control line port 74 in the chamber housing 28, the control line port 74 being in communication with the chamber 30.

The above disclosure also provides to the arts a safety valve 24 for use in a subterranean well. In one example, the safety valve 24 can include a piston 32, and a chamber housing 28 having a piston bore 72 and a chamber 30 formed therein, the piston bore 72 being in communication with the chamber 30, and the chamber 28 being enclosed by only a single chamber housing material 58.

The chamber 30 may be bounded by only a single solid structure of the chamber housing 28.

The chamber housing material 58 may be deposited about the chamber 30. The chamber housing material 58 may be cast about the chamber 30.

The chamber 30 may comprise an annulus that encircles a central longitudinal flow passage 22 formed through the chamber housing 28.

A system 10 for use with a well is also described above. In one example, the well system 10 can include a tubular string 18, and a safety valve 24 connected in the tubular string 18, the safety valve 24 including a chamber housing 28, a chamber 30 in the chamber housing 28 being in communication with a control line 26 extending to a remote location, an inner wall 66 of the chamber housing 28 being positioned between the chamber 30 and an internal flow passage 22 extending longitudinally through the chamber housing 28, and an outer wall 70 of the chamber housing 28 being positioned between the chamber 30 and an exterior of the chamber housing 28, the inner and outer walls 66, 70 comprising a continuous chamber housing material 58.

The chamber 30 may be enclosed by only the single chamber housing material 58. The chamber 30 may be bounded by only a single solid structure of the chamber housing 28.

The well system 10 may include a communication tool 60 including a member 64 that penetrates the inner wall 66 of the chamber housing 28 to provide communication between the chamber 30 and the communication tool 60.

The chamber housing material 58 may comprise a material deposited, cast, or otherwise formed about the chamber 30.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations, such as inclined, inverted, horizontal, vertical, etc., and in various configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of manufacturing a safety valve chamber housing, the method comprising:
    depositing a chamber housing material, thereby gradually building up the chamber housing and forming a chamber in the chamber housing, in which the chamber is completely enclosed by the chamber housing material, the chamber being bounded by only a single solid structure of the chamber housing; and
    then forming a piston bore and a control line port in the chamber housing, whereby the piston bore and the control line port communicate with each other via the chamber.

2. The method of claim 1, in which the forming comprises forming the chamber as an annulus that encircles a central longitudinal flow passage formed through the chamber housing.

3. The method of claim 1, in which the depositing comprises progressively discharging the chamber housing material from an instrument.

4. The method of claim 1, in which the depositing comprises placing the chamber housing material in a mold.

5. The method of claim 1, in which the depositing comprises casting the chamber housing material about the chamber.

* * * * *

UNITED STATES PATENT AND TRADEMARK OFFICE
CERTIFICATE OF CORRECTION

PATENT NO. : 10,641,063 B2
APPLICATION NO. : 15/602907
DATED : May 5, 2020
INVENTOR(S) : Gary Benjamin Lake

Page 1 of 1

It is certified that error appears in the above-identified patent and that said Letters Patent is hereby corrected as shown below:

In the Claims

Claim 1, Column 8, Line 12, cancel "then"; Line 13, insert -- after forming the chamber in the chamber housing -- after housing.

Signed and Sealed this
Fourteenth Day of July, 2020

Andrei Iancu
*Director of the United States Patent and Trademark Office*